2 Sheets—Sheet 2.

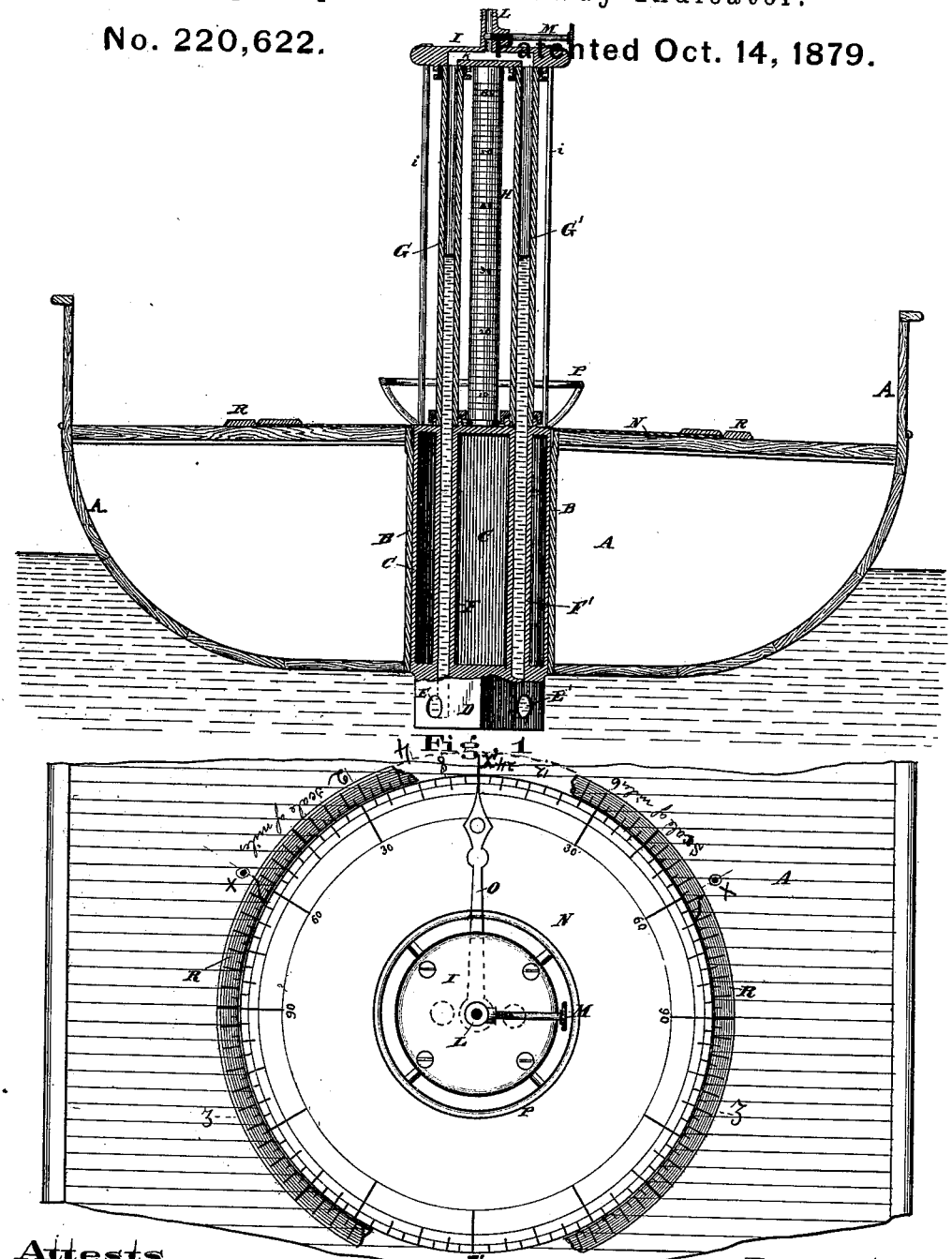
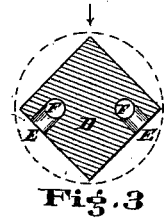

W. HUSTON.
Ships' Speed and Leeway Indicator.

No. 220,622.   Patented Oct. 14, 1879.

Attests
Wm. Smith
Henry V. Buckley

Inventor
William Huston
by George E. Buckley
his Atty.

UNITED STATES PATENT OFFICE.

WILLIAM HUSTON, OF WILMINGTON, DELAWARE, ASSIGNOR TO WILLIAM B. WILKINS, OF BROOKLYN, NEW YORK.

IMPROVEMENT IN SHIPS' SPEED AND LEEWAY INDICATORS.

Specification forming part of Letters Patent No. 220,622, dated October 14, 1879; application filed June 17, 1879.

*To all whom it may concern:*

Be it known that I, WILLIAM HUSTON, of the city of Wilmington, State of Delaware, have invented a certain new and improved indicator for determining the speed of vessels, their leeway, and the operation of currents in navigating them; and I do hereby declare the following to be a full, clear, and exact description of the same, reference being had to the annexed drawings, making part hereof.

The nature of my invention will fully appear from the following specification and claims.

To enable others skilled in the art to make and use my improvement, I will describe its construction and operation.

Figure 4:
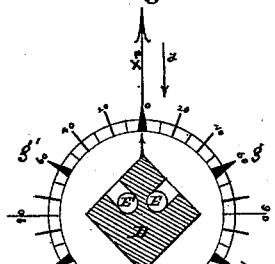
Figure 9:
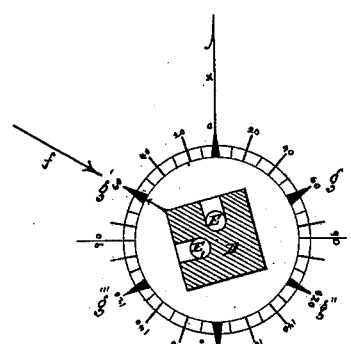
Figure 5:
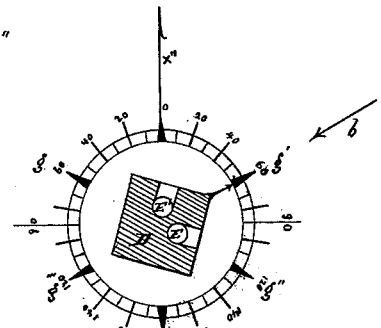
Figure 10:
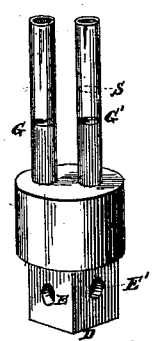
Figure 8:
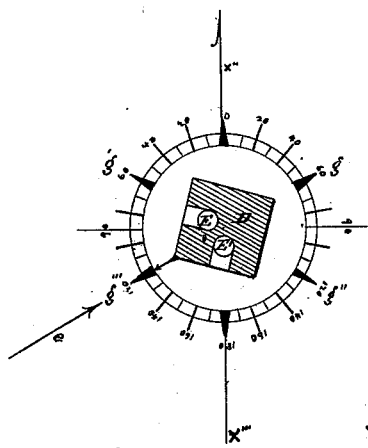
Figure 6:
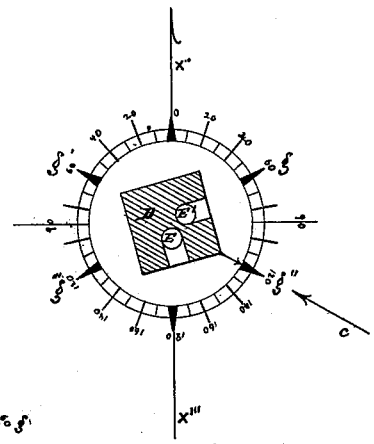
Figure 7:
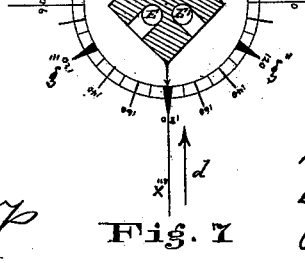

In the drawings, Figure 1 is a vertical cross-sectional view of my apparatus; Fig. 2, a plan view; Fig. 3, a horizontal cross-sectional view of the pierced block at the foot of my apparatus. Figs. 4 to 9 are diagrams showing the various directions in which the openings of the tubes can be faced. Fig. 10 is a perspective view of the block and glass tubes.

A is a section of a vessel furnished with my apparatus; B, a tube or well for receiving the same, passing from the deck to bottom of the ship; C, the outer tubular shell of that part of my apparatus which fits in the well B; D, a square block containing holes E E', which communicate directly, one with the tube F G, the other with the tube F' G'. These tubes G G' are connected at the top by a tubular air-passage, K, in cap I. H is a central scale for determining the variations in the respective heights of the water in tubes G G'; I, a cap fitting over the tops of tubes G G', and containing a nozzle, L, which opens below into passage K, and is closed or opened by a valve, M. *i i* are rods supporting cap I; N, a compass-dial; O, a pointer attached to the apparatus to indicate the number of degrees the point is moved; P, a circular guard around the base of the glass tubes G G'. The parts G G' of tubes F G and F' G' are of glass, while the parts F F' are of metal. R is a supplemental circular dial marked and divided with figures to indicate miles.

One object of my invention is to indicate the true course in which the vessel is steaming or sailing.

My instrument may be set so near the vessel's bottom that the water of the ocean will enter at the holes E E' and rise up in the glass tubes G G' to the level of the sea; or, by placing an air-pump upon the nozzle L and withdrawing part of the air from said tubes, the water may be raised to almost any desired height in tubes G G', and to keep it suspended in this state the cap I or opening L should be made air-tight. This can be done by closing valve M. The dial-disk N is capable of being turned like a turn-table, and the apparatus C G I can also be turned around, it being set or suspended loosely in the well B— that is, it is not rigid therein. It can be also raised out of this well. The vessel is, of course, being propelled forward either by steam-power or the force of the wind upon her sails. We will suppose the two tubes G G' to be in the position shown in Fig. 1—that is, so that a line drawn straight across the deck of the vessel through the center of one tube will pass through the center of the other tube. If the vessel is tacking against the wind in a certain direction, it becomes of importance to ascertain whether she is progressing in the course in which she is pointed, or whether she is making leeway, and also, if she is thus being blown from her true course, how many points off she is sailing.

The openings E E' are toward the bow of the vessel, each opening into a plane surface of the block, which plane surface is at an angle of about ninety degrees to the line of the keel of the ship. Now, if the leeway is in the direction of that side of the vessel upon which opening E' occurs, the vessel will be forging in that direction while she is pointed in her true course. This, as the vessel moves ahead, will cause the water to be forced into this opening, while opening E will be almost wholly shielded, as it occurs on another face of block D.

The pressure of water into hole E' will thus cause a rising of the water in tube G', forcing part of the air in this tube up through passage K into the tube G. This will increase the pressure above the water in tube G and force the water in the latter tube down. Thus a very distinct warning will be given to any observer of the glass tubes that the ship is losing leeway in a certain direction. Now, in order to ascertain how many points off the true course she is actually sailing, I proceed as follows: The indicating-finger O, under the above conditions, is in line with the vessel's keel, pointing forward, and it must then be observed what point upon the dial N is indicated by it. Then, as the column of water in tube G′ is much higher than that in tube G, this finger must be turned in a direction toward that in which the vessel is making leeway, the tubes turning with it until the pressure of water upon the holes E E′ is equal, which will be indicated by the columns of water in tubes G G′ gradually attaining the same level. Now, at this point, the edge of the block between the holes E E′ is pointing or turned exactly in the direction the vessel is really sailing. On observing the point upon the dial-plate N now indicated by finger O, and counting the points between that and the one it started from when in line with the keel, the number of points resulting will be the points she is losing in leeway.

When a vessel is sailing or steaming along she may be subjected to the influence of a current which cannot be observed ordinarily. Her head or keel may be pointed in a certain direction while a current may be carrying her out of it to one side or the other. The force of this current will be contending against the force which is used to carry the vessel on her desired course.

When the indicator-finger O is in line with the keel, the two tubes G G′ are always in the position first described. (Shown in Fig. 1.) This finger O always points over that edge of the square block D which is between the holes E E′, Fig. 1, so that when that edge is directed forward toward the bow of the vessel the finger O also points forward in a line with the keel. This finger is secured rigidly to the apparatus, to the bottom of which the block D is also rigidly attached—that is, the apparatus E C G—and this block D turns with the finger O. The block D sets just below the line of the lower face of the keel, so as to be susceptible and exposed to the action of the water. Whenever it becomes necessary to turn block D it is always advisable to raise it up a little into well B, so as to leave no single hole, E or E′, exposed to the full force of the current as the block is turned. This can be easily done, as the apparatus to which the block is affixed fits loosely in well B, and can be raised up therein from above.

Experiment has demonstrated the following facts: If the vessel is moving in still water, and subjected to no influences to divert her from her course, and the finger O is pointed forward to X″, Fig. 4, the columns of water in tubes G G′ will be at the same height; so, also, if this finger is turned so as to point toward the stern X‴, Fig. 7, in line with the keel, the same effect will be produced; also, the columns of water will be at the same height if the finger is turned to points $g″$ or $g‴$, Figs. 6 and 9, in which figures the arrows X″ and X‴ indicate the line of the keel of the vessel. The distances between points X X′ and X Z, Fig. 2, are each equal to one-sixth of the circle R. If the finger O is placed upon one of points X, it will throw one of holes E or E′—say E—around so as to be directed straight toward the bow of the vessel, and opening E′ will be toward the side of the ship, and in this position, if the ship is going straight ahead, the force of water-pressure will send the water in the tube G up to a great height; but if the finger O is turned to any one of points Z, Fig. 2, one of these holes will be toward the side of the vessel and the other toward the stern, and the columns of water in tubes G G′ will be equal. This may be because the water is forced so rapidly past the hole at the side as to be unable to enter it or to exert any force upon it, while the operation of the water at the hole directed toward the stern is nothing, not receding rapidly enough to create a vacuum in the corresponding glass tube and not entering it; but if the indicating-finger be turned to any point between either of the points Z and Z′, the effect is observable immediately in the rising of the water in that tube (G or G′) which corresponds with the hole (E or E′) which is nearest to the side of the ship. When the finger is half-way between points Z and Z′, the water in such tube is at its greatest altitude, and from that point to point Z′ it gradually retires until at Z′ the water in both tubes G G′ is at the same level. In continuing to turn toward the point Z on the opposite side, the water will rise highest in the other tube and retire to the same level upon reaching the point Z. When the indicating-finger O is over either of the points X X, the water in that tube (G or G′) which corresponds to the hole (E or E′) which is thrown forward will be at its highest altitude, and the water in the tube corresponding to the hole which is thus thrown to the side of the ship will simultaneously therewith be at its lowest point. These facts have been demonstrated by experiment.

To follow the numbering of the figures upon Sheet 2 of the drawings from 4 to 9, inclusive, and allowing, for the sake of illustration, the letter E to represent tube G, and E′ to represent tube G′, the course of the vessel is in a direction indicated by the arrow X″. I will suppose the water to be still or quiet water, and the vessel to be progressing in the direction indicated by arrow X″. Now, when the block is situated as in Fig. 4, the water in tubes E E′ will be at the same level. When the block is turned, as at Fig. 5, the water in E′ will have reached its greatest altitude, and that in E its least. When it reaches that position shown in Fig. 5, the water will have fallen in E′ and risen in E until the water in both is at the same level. Now, as I turn it from $g″$ toward the point 120°, the water in E will have reached its highest altitude, and that in E' its lowest. At point X''' (180°) the water in both will be at the same level again. In turning it from X''' toward point g''', when it reaches 120°, the water in E' will be at its highest and that in E at its lowest point. Upon reaching g''', Fig. 8, the water in both will be at the same level again. Passing point g''', the water in E will begin to rise, and that in E' to fall, until, in turning toward X'', when the point or finger reaches point g, (60°,) Fig. 9, the water in E will be at its greatest height, and that in E' at its lowest. Then, as I approach X'', Fig. 4, the water in E gradually recedes, that in E' rising, until, on reaching point X'', Fig. 4, the water in both is again at the same level. This, also, I have demonstrated by experiment.

Now, in order to find whether a current from any direction is affecting the course of the ship, I proceed as follows: If I wish to find whether the current is from the starboard or right side of the ship, I set the indicating-finger O so as to place the block in the position shown in Fig. 6, at a point which, in still water uninfluenced by a current, would leave the water in the tubes at the same level. Now, if the current is from the starboard side of the vessel, she will be forging ahead in a line different from that of the direction of the current. The result will be that the pressure of the current upon hole E' will raise the water in tube G' above that in tube G. Thus the existence and direction of the current will be indicated as coming from the starboard side. If there is no current thus indicated, I then turn the block to port—that is, to the point shown in Fig. 8—which is another point where in still water the water in the tubes will be at the same level. If there is a current from that direction, the greatest pressure of water will be upon the opening E, and the water of tube G will rise above the level of that of tube G'. In case the vessel is found to be influenced by a current, she can be so headed as to overcome its influence and prevent the possibility of being carried out of her true course by it.

If it is desired to ascertain the speed at which the vessel is going, I proceed as follows: I first test the vessel's speed by shore-marks and time her. When the block D is in the position shown at Figs. 1 and 4, and the vessel is at rest, the water in the tubes is, of course, not so high as when she is in motion, and the faster she moves the higher the water will rise in the tubes. Now, using mile-marks on the shore, and noting her time as she moves, it will be necessary to note the height of water in the tubes when she is moving, say, at the rate of fifteen miles an hour, how high when she is going eighteen, and so on, and to note by the scale in the cylindrical tube H how high the water rises at various speeds. I will suppose that at the speed of fifteen miles per hour the water rises in these tubes to the height of 40 in scale H; at eighteen miles, to 45 on this scale, and so on. Having determined the heights for various speeds, it becomes a simple matter at any time thereafter to determine the speed by looking at the height of water in the columns as indicated by this scale.

The gage of speed may be made in different ways. I can accomplish it by the use of one tube, the indicating-finger O, and the circular scale R. We will take that part of the scale R which is situated between the points X and X', Fig. 2, that section of the said scale toward the port bow. By turning the finger of this point the tube G is thrown to the front, and when the vessel is in motion the water in this tube is at its greatest height, and it is at its lowest in tube G'. I first fix the run by shore-marks, as before, but do it upon scale R. Thus, if the water is at a certain height in tube G at one mile speed per hour, I mark the point indicated on this scale by the finger O "1 mile." When she is going at a rate of fifteen miles an hour, I move the finger O (consequently the block D and tube G) to the point on scale R necessary to keep the water at the same level as when she ran at one mile, and then mark the point on scale R which is covered by the finger O "15 miles," and so on. Having found and thus marked the points of scale R to which it is necessary to turn the finger in order to keep the water in tube G at different speeds, it is thereafter only necessary to note the mile-mark indicated by the finger O when the tube G is so turned as to have the water at the gage-level. As the vessel increases its speed it becomes necessary to turn this finger to a higher mile-indication on scale R in order to keep the water-level in tube G down to the gage-level.

Having thus described my invention, what I claim as new, and desire to secure by Letters Patent, is—

1. The combination of pierced block D and tubes F F', having transparent sections G G', operating substantially as and for the purposes described.

2. The combination of pierced block D and tubes F F' G G', all so arranged as to be movable to face the various points of the compass, substantially as and for the purposes described.

3. The combination of well B and the tubes, F F' G G', suspended therein, and having openings E E' below, substantially as and for the purposes described.

4. The combination of the pierced block D, tubes F F' G G', indicating-finger O, and the above-described scale or dial or dials, substantially as and for the purposes described.

WILLIAM HUSTON.

Witnesses:
C. F. SIMMON, Jr.,
GEORGE E. BUCKLEY.